Patented Sept. 13, 1949

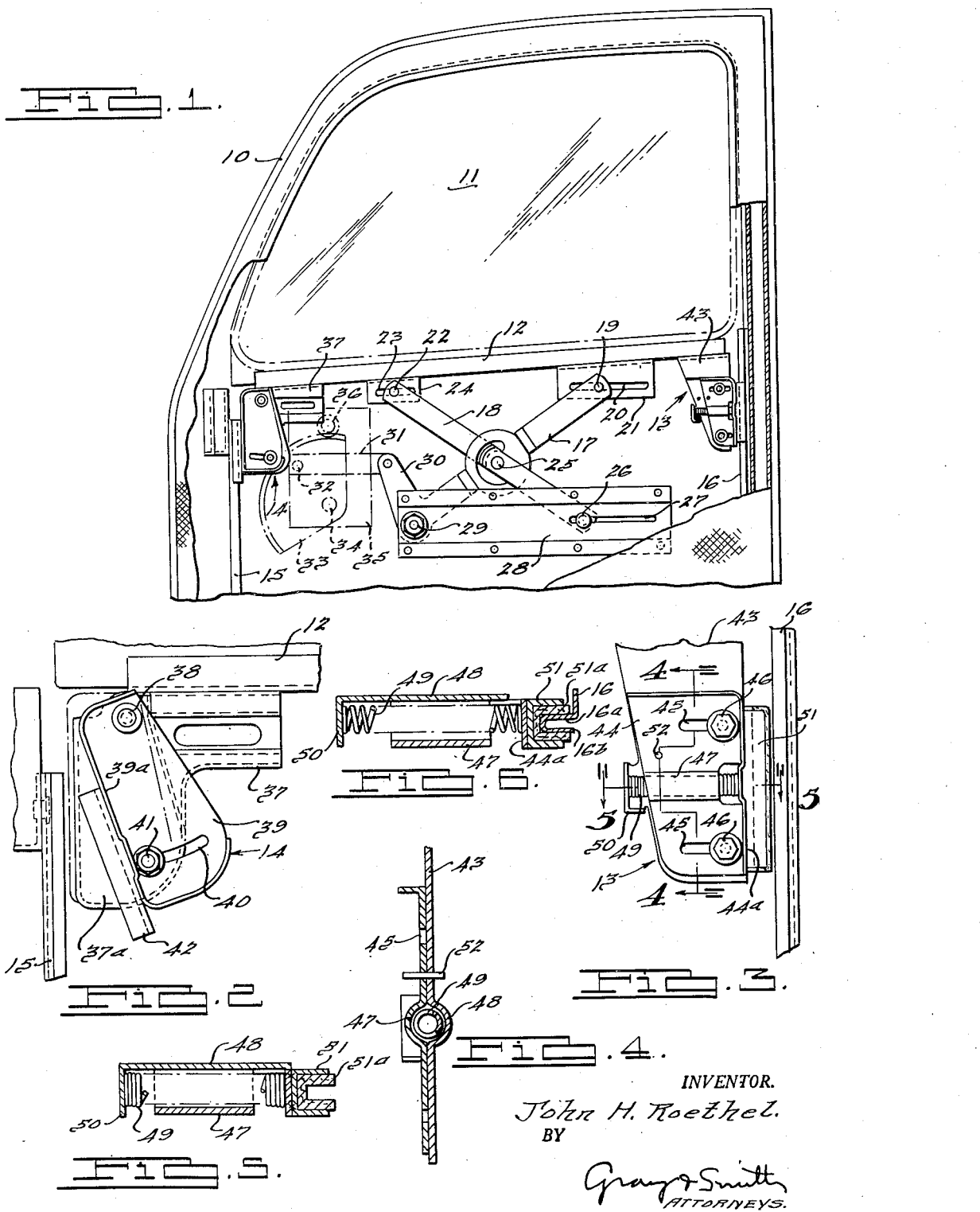

2,481,536

UNITED STATES PATENT OFFICE 2,481,536

WINDOW GUIDE MECHANISM FOR VEHICLE BODIES

John H. Roethel, Detroit, Mich., assignor to Roethel Engineering Corporation, Detroit, Mich., a corporation of Michigan Application October 15, 1945, Serial No. 622,255

8 Claims. (Cl. 296—44.5)

1

This invention relates to window control mechanism and particularly mechanism for controlling the operation of glass or transparent panels or the like of vehicles, especially automobile bodies, an object of the invention being to provide an improved mechanism which is compact, relatively simple in construction and economical to manufacture, requires a minimum of space in the body, eliminates considerable frictional resistance to the movement of the window panel, is capable of being easily assembled and adjusted properly within the body, and is adapted for use without material changes to various types of windows.

A further object of the invention is to provide a window panel control mechanism embodying improved means of simple and efficient construction for guiding the window panel within the well of a vehicle body, especially an automobile body, the improved construction being such that the panel is guided with a minimum of frictional resistance to its travel while the guide means in the well is substantially noiseless or constructed in such manner as to avoid chattering or vibrating noises during operation of the vehicle and at the same time is easy to install and adjust for efficient operation.

Another object of the invention is to provide an improved window guide mechanism embodying fixed upright guides within the window well each formed of an angle having a single guide flange or rib extending longitudinally within the well and adapted to be engaged by a guide device secured to the lower edge of the window panel, such as a member grooved to embrace the guide flange and capable of being maintained at all times in proper guiding relation to the flange.

Still a further object of the invention is to provide improved guide means for a window panel embodying depending guide shoes or members positioned so as to slidingly embrace upright guide members spaced apart longitudinally within the window well of a vehicle body, the guide shoes or either of them being so mounted and the improved construction being such as to permit the same to be readily retracted from normal guiding position and maintained in such retracted position out of contact and free of interference with the upright guide members during installation of the window panel, after which the shoe is readily shiftable into proper guiding relation to its associated guide member.

Other objects of this invention will appear in the following description and appended claims, reference being had to the accompanying drawings forming a part of this specification wherein

2 like reference characters designate corresponding parts in the several views.

Fig. 1 is a fragmentary inner side elevation of an automobile door having installed therein a window control mechanism embodying the present invention.

Fig. 2 is an enlarged fragmentary side elevation of the guide structure shown at the left in Fig. 1.

Fig. 3 is an enlarged fragmentary side elevation of the guide structure shown at the right in Fig. 1.

Fig. 4 is an enlarged vertical section taken substantially through lines 4—4 of Fig. 3 looking in the direction of the arrows.

Fig. 5 is an enlarged section taken substantially through lines 5—5 of Fig. 3 looking in the direction of the arrows and illustrating the guide shoe in retracted position.

Fig. 6 is a view similar to Fig. 5 but illustrating the guide shoe in extended position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings wherein I have illustrated, by way of example, one embodiment of the present invention, there is shown at 10 a door of an automobile body comprising a door frame of any suitable construction formed with a main window opening which is adapted to be closed by means of a vertically slidable glass or other transparent panel 11. It will be understood that the present invention may be utilized in connection with any of the windows of an automobile body and, in addition, may be used generally with various window structures of vehicles or the like.

The sliding panel 11 is mounted in conventional manner within the window opening with the side and top edges thereof embraced within the usual glass run channels around the margin of the window opening when the window panel is fully raised. Secured to the lower edge of the sliding panel 11 is a retainer channel 12 to which the window regulator is adapted to be attached. Carried by the glass retainer channel 12 and depending from opposite ends thereof are guide devices generally indicated at 13 and 14. The guide device 14, shown at the left in Fig. 1 and which for convenience may be considered the front guide device, is adapted to cooperate with a fixed upright guide 15 mounted within the window well formed between inner and outer door or body panels and rigidly secured by suitable brackets to the inner metal door panel. In like manner, the guide device 13, shown at the right in Fig. 1 and which for convenience may be considered the rear guide device, is adapted to cooperate with a fixed upright guide member 16, similar to the guide member 15, and rigidly secured within the window well to the rear upright pillar or frame member of the door.

The window panel 11 may be raised and lowered by means of suitable window regulator mechanism mounted within the window well below the main window opening. In the present instance, there is shown a window regulator of the cross-arm type comprising a pair of intersecting crossed arms 17 and 18 for shifting the window panel into and out of the window well. The swinging arm 17 is shown as the driving arm and is provided at its outer end with a connection including a stud 19 adapted to travel within a longitudinal guideway or guide slot 20 formed in a bracket 21 having a horizontal flange at its upper edge secured, as by spot welding, to the bottom of the retainer channel 12. Similarly, the swinging arm 18, which is herein shown as the balance arm of the regulator, is provided at its outer end with a connection including a projecting stud 22 adapted to travel within a longitudinal guide slot or guideway 23 formed in a bracket 24 having a flange at its upper edge secured, as by spot welding, to the bottom of the retainer channel 12. The arms 17 and 18 are pivoted together at 25 at the locality of their crossing and the construction and arrangement of the arms are such that they will pass by each other during operation. The inner or lower end of the arm 18 is provided with a connection including a stud 26 slidable within a guideway or guide slot 27 in a mounting plate 28 attached by screws to the inner metal door panel. The inner or lower end of the driving arm 17 has a pivotal connection at 29 with the mounting plate and is formed with an upwardly projecting angular extension or crank arm 30 to the outer end of which is pivoted a push and pull link 31 which in turn is pivoted at 32 to a driving gear 33 pivoted at 34 to a mounting plante 35 secured to the inner door panel. The gear 33 is driven by means of a pinion 36 secured in the usual manner to a transverse handle shaft which may be turned by a crank handle mounted at the inner side of the door. It will be readily understood that by turning the gear 33 in one direction or the other the link 31 will be shifted endwise to swing the crank 30 and thereby swing the driving arm 17 downwardly or upwardly, this motion being transmitted to the balance arm 18 which, therefore, swings in unison with the driving arm so as to raise and lower the window panel 11.

Referring particularly to Fig. 2, the guide device or structure 14 comprises a depending bracket 37 carried by the retainer channel 12. This bracket is preferably in the form of a one-piece stamping having a horizontal flange at its upper edge secured, as by spot welding, to the bottom of the channel 12. The bracket has a depending extension 37a continuously flanged around its edges and preferably positioned so as to lie immediately below the front bottom corner of the window panel 11 when the lower edge of the latter is installed within the retainer channel 12. To the upper end of the bracket 37 there is pivoted at 38 a depending guide shoe carrier 39 in the form of a one-piece stamping which is flanged continuously at 39a around its top, front and bottom edges. The face of the carrier 39 lies smoothly against and in juxtaposed relation to the vertical face of the bracket extension 37a, permitting the carrier to swing in a generally vertical plane about the pivot 38. The lower end of the guide shoe carrier or support 39 is formed with an arcuate guide slot 40 having its center of curvature at the pivot 38 and through which extends a headed bolt 41 threaded into a screw boss on the bracket extension 37a. The bolt 41 has a hex-head conveniently positioned for engagement by a socket wrench, there being a lock washer between the head of the bolt and the face of the carrier member 39. Thus, by loosening the bolt the member 39 may be swung in one direction or the other with the shank of the bolt riding within the arcuate guide slot 40. By tightening the bolt 41 the carrier 39 may be locked in any adjusted position. Rigidly secured to the upright flanged edge 39a of the member 39 is a guide shoe 42 of suitable length and of channel construction adapted to be swung into and out of guiding relation to the fixed upright guide 15. The construction of the guide shoe 42 and the guide 15 is the same as the corresponding elements at the opposite end of the window panel and will be hereinafter described.

The guide device or structure 13 at the rear edge of the window panel comprises a bracket 43 which is in the form of a one-piece stamping having a horizontal flange at its upper edge secured, as by spot welding, to the bottom of the retainer channel 12. Slidingly mounted against the face of the bracket 43 is a guide shoe carrier or support 44 which is also preferably in the form of a one-piece stamping. The carrier member 44 is formed with vertically spaced longitudinally extending guide slots 45 which receive the shanks of headed bolts 46, similar to the bolt 41, threaded into tapped screw bosses in the depending bracket 43. The heads of the bolts 46 are conveniently positioned for engagement by a socket wrench for loosening or tightening the bolts, there being lock washers interposed between the heads of the bolts and the face of the carrier member 44. This member is arranged face to face in juxtaposed relation to the face of the bracket 43 so as to permit free sliding motion of the carrier member back and forth as desired with the shanks of the bolts 46 riding within the guide slots 45. The carrier member or plate 44 and the bracket plate 43 are formed with opposed arcuate embossments 47 and 48 which together form a channel through which freely extends a compression spring 49. The front end of this spring bottoms against a flanged retainer piece 50 stamped out from the rear edge of the bracket plate 43, and the rear end of the spring bottoms against the flanged edge 44a of the carrier plate 44. The spring is thus interposed between a portion of the fixed bracket 43 and a portion of the shiftable carrier member 44 and preferably is held under compression in all positions of the member 44. Rigidly secured, as by spot welding, to the outer face of the flanged edge 44a of the member 44 is a vertically extending guide shoe 51 of suitable length corresponding to the length of the guide shoe 42. This shoe 51 is preferably in the form of a channel having a channel-shaped lining 51a of felt-like or other equivalent soft pile material. This material 51a is firmly bonded to the channel 51 so as to remain intact at all times.

As illustrated in Fig. 6, the guide 16 is in the form of an angle member having a base rigidly attachable, as by spot welding, to the frame or other portion of the door structure. This base terminates in an inwardly or longitudinally extending flange 16a the metal of which is folded or turned back upon itself to provide a second and parallel flange 16b spaced from the flange 16a. These flanges 16a and 16b are joined by a rounded edge of increased radius. Thus, the flanges 16a and 16b of the guide 16 form a guide track or rail adapted to be embraced by the channel-shaped guide shoe 51. As a result of this construction, there is provided a guide track cooperable with the guide shoe having an effective thickness greater than twice the thickness of the metal and having a rounded edge of sufficient radius to reduce wear on the soft material 51a at the bottom of the groove therein. In addition, the spacing of the flange portions 16a and 16b permits some compressibility or yielding of the sides of the track so as to assist in accommodating or compensating for any slight misalignment of the guide shoe and guide as a result of production inaccuracies. It will be understood that the channel-shaped guide shoe 42 at the opposite end of the window panel is constructed similarly to the guide shoe 51 with its relatively soft liner 51a, and it will also be understood that the guide 15 is constructed similarly to the guide 16.

It is important to note that the length of the slots 45 is sufficient to permit the guide shoe carrier 44, after loosening the bolts 46, to be retracted, i. e. shifted away from the guide 16, to back the shoe 51 off the guide flanges 16a, 16b so that the latter will be entirely out of the groove in the liner 51a as shown in Fig. 3. When the guide is thus retracted the bolts will move to positions near the rear ends of the slots 45 and this retraction of the guide will compress the spring 49 as shown in Fig. 5. Provision is made in the present instance for locking the member 44 in its retracted position, as shown in Figs. 3, 4 and 5, so as to facilitate installation of the window panel and prevent interference or contact of the guide shoe 51 with the guide 16 during installation. In the present embodiment of the invention this is accomplished by providing holes in the member 44 and bracket 43 which are adapted to be brought into registry upon retraction of the member 44, and when these holes register a locking pin 52 may be inserted through the holes, as shown in Fig. 4, thus restraining counter-movement of the member 44 under the expansion effort exerted by the spring 49.

The construction of the guide device is such as to enable the window panel 11 with the retainer channel 12 and guide devices 13 and 14 mounted on the lower edge of the window panel to be installed through the upper end of the window well by tilting the window panel and shifting it downwardly through the narrow slot along the window sill between the upper edges of the inner and outer door panels. Before installing the window panel the guide carrier 39 is swung rearwardly about its pivot 38 to the position shown in Fig. 2 and held in this position by tightening slightly the bolt 41. When thus positioned it will be seen that the guide shoe or channel 42 will be moved entirely out of line with the vertical guide 15. In addition the guide carrier 44 is fully retracted as shown in Fig. 3 and is locked in this position by the pin 52. Thus, when the window panel is ready to be installed the guide devices 13 and 14 will be held in their retracted positions shown in Figs. 2 and 3. The window panel may then be tilted and inserted through the relatively narrow longitudinal slot or opening along the bottom of the window opening and may be shifted downwardly into the winding and may be shifted downwardly into the window well without interference or contact of the guide shoes 42 and 51 with the fixed upright guides 15 and 16. When the upper edge of the window panel has cleared the header of the window opening it may be tilted back into vertical position within the window well so as to line up the guide shoes 42 and 51 with the guides 15 and 16. When this has been accomplished it is merely necessary for the workman to swing the carrier member 39 forwardly so as to engage the guide shoe 42 with the guide rib or track on the guide member 15 in the manner shown in Fig. 1, after which the bolt 41 is firmly tightened with a socket wrench. Also, it is merely necessary for the workman to withdraw the locking pin 52 thereby permitting the expansion effort of the spring 49 to move the guide shoe 51 automatically into position on the guide rib or track 16a, 16b of the guide 16, as shown in Fig. 6. The spring 49, which is of preferably selected strength, will thus hold the shoe 51 in operative and firm guiding relation to the guide 16 and without requiring the attention of the workman in obtaining the proper sliding fit of the parts. In other words, upon removing the pin 52 the guide shoe 51 will automatically move under the action of the spring 49 into correct position with respect to the guide 16, and thereupon the shoe 51 if desired may be clamped in this position by tightening the bolts 46. However, even if the workman neglects to tighten the bolts 46 the guide shoe 51 by virtue of the pressure exerted by the spring 49 will be yieldingly maintained in proper guiding relation to the guide 16 during operation of the window panel. Thus, a minimum of skill and attention are required not only in installing the window panel but also in positioning the guide devices properly with respect to the fixed upright guides within the window well. It will be understood that the adjusting slots 45 and 40 are not only sufficiently long to permit the guide shoes to be backed clear off the guide flanges or ribs of the guides 15 and 16 but also to be adjusted to increased depth with respect to the guide flanges so as to take up or compensate for wear after continued use.

I claim:

1. In a window guide, a retainer channel adapted to be secured to the edge of a window panel, a bracket depending from one end of the channel, a member shiftably mounted on said bracket for movement in a general direction longitudinally of the channel, a guide shoe secured to said member, spring means urging said member and shoe in an outward direction, and a device free of operative engagement with said spring means for releasably locking said member in retracted position to the bracket against the effort exerted by said spring means, said device being releasable to unlock said member and bracket and to permit said spring means automatically to shift said member and the guide shoe in an outward direction.

2. In a window guide, a retainer channel adapted to be secured to the lower edge of a window panel, a bracket member depending from an end of the channel, a guide member mounted on said bracket, vertically spaced transversely extending guide bolts carried by one member and extending through longitudinal slots in the other member, and spring means interposed between said bolts and connecting said members together in such manner as to urge the guide member in an outward generally longitudinal direction.

3. In a window guide, a retainer channel adapted to be secured to the lower edge of a window panel, a bracket member depending from an end of the channel, a guide member mounted on said bracket, vertically spaced transversely extending guide bolts carried by one member and extending through longitudinal slots in the other member, spring means interposed between said bolts and connecting said members together in such manner as to urge the guide member in an outward generally longitudinal direction, and means free of operative engagement with said spring means for releasably locking said guide member to the bracket member in retracted position against the effort exerted by said spring means.

4. In a window guide, a retainer channel adapted to be secured to the lower edge of a window panel, a bracket member depending from an end of the channel, a guide member mounted on said bracket, vertically spaced transversely extending guide bolts carried by one member and extending through longitudinal slots in the other member, spring means interposed between said bolts and connecting said members together in such manner as to urge the guide member in an outward generally longitudinal direction, and a locking pin insertable through holes in said members for holding the bracket member in retracted position against the effort exerted by said spring means.

5. In a window guide, a retainer channel adapted to be secured to the edge of a window panel, a pair of longitudinally spaced brackets fastened to said channel, a member pivoted to one of said brackets, a slide mounted on the other bracket, means for guiding said member for swinging movement and for securing the same to its bracket in fixed position, means for guiding said slide for longitudinal movement on its bracket and comprising a pair of vertically spaced studs on the bracket extending through spaced parallel slots in the slide, spring means urging the slide in one longitudinal direction, and guide devices carried by said member and slide.

6. In a window guide, a retainer channel adapted to be secured to the edge of a window panel, a bracket depending from one end of the channel, a member shiftably mounted on said bracket for movement in a general direction longitudinally of the channel, a guide shoe secured to said member and including a channel piece, vertically spaced devices extending transversely of the window panel through said member and bracket for holding said member in a predetermined position, and spring means interposed between said devices and connecting said member and bracket together for urging said member and shoe in an outward direction.

7. In a window guide, a retainer channel adapted to be secured to the edge of a window panel, a bracket depending from one end of the channel, a member shiftably mounted on said bracket for movement in a general direction longitudinally of the channel, a guide shoe secured to said member, spring means urging said member and shoe in an outward direction, and means for releasably locking said member in retracted position against the effort exerted by said spring means, said last means comprising a pin insertable through holes in said bracket and member.

8. In a window guide, a retainer channel adapted to be secured to the edge of a window panel, a pair of longitudinally spaced brackets fastened to said channel, a member pivoted to one of said brackets, a slide mounted on the other bracket, means for guiding said member for swinging movement and for securing the same to its bracket in fixed position, means for guiding said slide for longitudinal movement on its bracket and comprising a pair of vertically spaced studs on the bracket extending through spaced parallel slots in the slide, spring means urging the slide in one longitudinal direction, and channel shaped guide shoes fastened to said member and slide.

JOHN H. ROETHEL.

REFERENCES CITED

The following references are of record in the file of this patent:

UNITED STATES PATENTS

| Number | Name | Date |
| --- | --- | --- |
| 1,604,486 | Saunders | Oct. 26, 1926 |
| 1,689,132 | Haarnagell | Oct. 23, 1928 |
| 1,713,088 | Nicholson | May 14, 1929 |
| 1,913,583 | Carr | June 13, 1933 |
| 2,059,027 | Potter | Oct. 27, 1936 |
| 2,236,447 | Roethel | Mar. 25, 1941 |
| 2,283,002 | Floraday | May 12, 1942 |
| 2,304,640 | Joachim | Dec. 8, 1942 |
| 2,326,532 | Graebner | Aug. 10, 1943 |
| 2,379,927 | Roethel | July 10, 1945 |
| 2,429,156 | Floraday | Oct. 14, 1947 |